UNITED STATES PATENT OFFICE 2,593,189

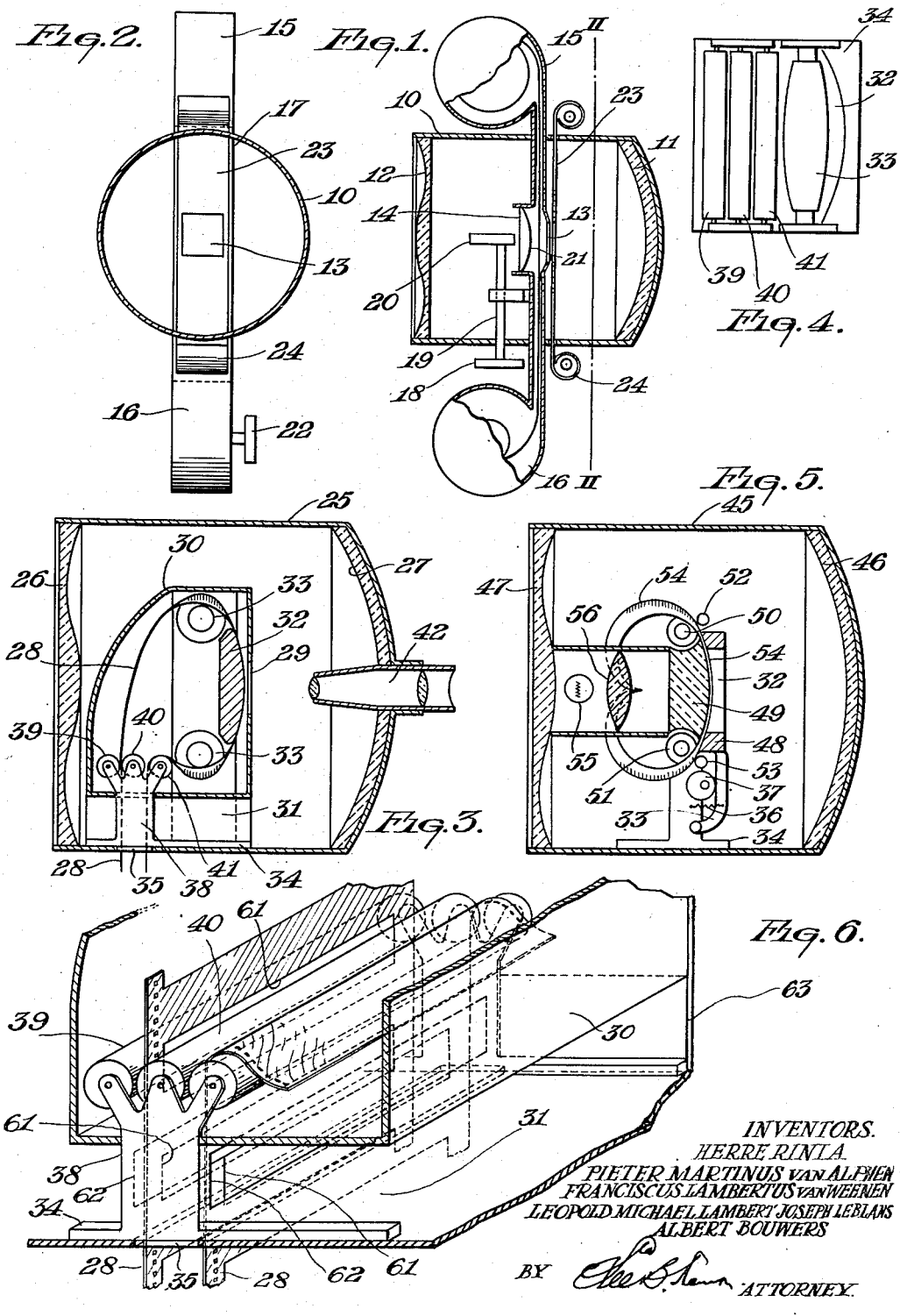

OPTICAL SYSTEM AND FILM GUIDE MEANS FOR CAMERAS, PROJECTORS, AND THE LIKE

Herre Rinia, Pieter Martinus van Alphen, Franciscus Lambertus van Weenen, Leopold Michael Lambert Joseph Leblans, and Albert Bouwers, Eindhoven, Netherlands, assignors, by mesne assignments, to Hartford National Bank and Trust Company, Hartford, Conn., as trustee Application April 18, 1946, Serial No. 662,966
In the Netherlands July 25, 1941

Section 1, Public Law 690, August 8, 1946
Patent expires July 25, 1961

2 Claims. (Cl. 95—11)

The present invention relates to a device for recording or reproducing images, which comprises a concave spherical mirror, an optical correcting element in or near the centre of curvature of this mirror and a convex support for the carrier on which the image is recorded or from which the image is reproduced, which support is located between the mirror and the correcting element. Such devices are known as Schmidt type optical systems. The optical correcting element near the centre of curvature of the mirror, which serves to obviate the spherical aberration of this mirror, is termed a Schmidt correcting element. Such cameras excel in a high definition with a large aperture and consequently a high luminous intensity. The main use of these cameras is in the field of astronomy. The sensitized plate or film on which the image is exposed is supported by a convex spherical image table placed between the correcting element and the mirror. However, these well-known cameras are adapted only for recording a single image. After each record the sensitized plate or the film on the image table must be replaced by a new one.

The present invention has for its purpose to render devices of the kind referred to above adapted for recording or reproduction by means of a film strip on which a plurality of images may be provided one behind the other and which film strip is moved stepwise or continuously through the apparatus.

It is already known to construct mirror cameras for recording by means of a film strip. In this type of apparatus, however, the concave mirror has an aperture and the image is recorded at the above-mentioned convex image table by means of an optical system in a flat picture gate behind the main mirror.

According to the invention the picture table in the apparatus itself lends itself to be used together with a film strip, since the support of this film strip where the film picture is recorded or reproduced has a spherical film path or film supporting surface and the invention further comprises means for making the film strip engage this spherical film path at the picture gate in such manner that the film strip can be moved over this film path.

The use of the invention permits the film strip at the picture gate to be given the required spherical curvature during the time in which the picture is recorded or reproduced, whereas the remaining part of the film strip may retain the usual flat shape. Upon moving the film strip for recording or reproducing the next image, only the part in question of the film strip is spherically bulged. The shape of the picture gate itself, i. e. the aperture which determines the image and through which passes the light, is independent of the curvature of the film at this point, and for this purpose the rectangular picture gate may be used.

In one form of construction of the invention the means for making the film strip engage the spherical film path at the picture gate consist of a pressure frame which also has a spherical shape and fits on the film path and in which a picture gate is left to clear. During the travel of the film, i. e. during the starting period, this pressure frame is moved away from the film path so as to enable the film strip freely to pass over the path.

In another form of construction of the invention guide rollers having a curved profile are provided in the direction of travel of the film before and behind the picture gate. In this case the film strip is given the required spherical curvature by stretching this film over the said two rollers on the spherical film path. In this case, also, a normal flat film may be used which in the remaining part of the apparatus remain flat.

Further features of the device according to the invention will be explained by reference to the accompanying drawing.

Figures 1 and 2 represent a device for recording images according to the invention.

Figures 3 and 4 represent a similar device comprising guide rollers having a curved profile before and behind the picture gate.

Fig. 5 represents an image-projection device according to the invention.

Figure 6 represents an enlarged view of the film guide channel of Fig. 3.

In Figures 1 and 2 the reference number 10 designates the cylindrical housing of the recording camera. The spherical mirror 11 is placed against the rear wall. This may, for instance, be a glass mirror whose surface is provided with a reflecting layer, thus avoiding double images due to the multiple reflection from the glass surfaces. The spherical aberration is corrected by a Schmidt's correcting element 12 placed at the centre of curvature of the mirror 11. The light rays collected by the correcting element 12 are reflected by the mirror 11 to the picture gate 13. This picture gate has a spherical shape. The picture gate 13 may be positioned substantially at the surface on which the image is formed, that is, the image surface.

In the construction illustrated the picture gate is stationarily mounted in the camera so that this camera is serviceable only for a definite distance of the object.

The required spherical curvature of the pictorial film 21 at the projection surface is obtained by providing the film guide 17 at the film gate 13 with a concave-spherical shape and by pushing the film into the gate by means of the convex spherical image table 14. In this case the film is enclosed during the recording operating between the spherical surface 14 and the hollow part of the film guide 17, so that the sensitized surface has acquired the necessary spherical curvature. In this state, however, movement of the film is undesirable, since the film surface would be readily damaged. For this reason the image table 14 is movable with respect to the film guide 17 in an axial direction of the camera, so that the space between these two parts can be increased. This permits the film 21 to resume its flat shape and be moved over the required distance. The engagement of the image table 14 is effected by means of a cam 20 which is driven by hand through the shaft 19 and a knob 18 from the exterior of the camera. The film strip is driven by means of the knob 22 which is coupled to the winding spool 16. The unexposed film stock is contained in the holder 15.

When the exposure takes place in an intermittent manner it is unnecessary to provide a shutter. However, for recording constantly exposed objects it is desirable to provide a shutter which is illustrated as a slit shutter 23 in the drawing. By a spring mechanism 24 the slit of the shutter is moved in the predetermined time in front of the picture gate. If only a small quantity of film need be used winding spools and unwinding spools for the film may be provided behind the picture table 14 so that no light is intercepted by them.

Fig. 3 represents another form of construction of a recording camera. The cylindrical housing 25 contains the spherical hollow mirror 27 in whose centre of curvature a Schmidt's optical correcting element 26 is provided which constitutes at the same time the closure member for the light aperture of the camera.

The mechanism for guiding and driving the pictorial film 28 is provided between the mirror and the correcting element. The convex spherical picture table 32 serves to give this film the exact spherical curvature at the picture gate. The guide rollers 33 located in the direction of the film path before and beyond this picture table have such a curved profile that the film 28 is curved in a cross-direction. By passing the film under tension over the rollers 33 and along the picture table it is ensured that this film engages the picture table 32 and thus obtains the required spherical curvature without making use of a pressure window.

For guiding the film further beyond the picture table there is provided a double film channel 38 into which is led both the part of the film approaching the picture gate and the part leaving this picture gate. Three smooth cylindrical guide rollers 39, 40 and 41 prevent the film parts from engaging each other on entering and leaving the film channel 38 and give a certain tension to the film in order to make it engage the picture table 32. In this form of construction the two parts of the film are led at one side to the exterior of the apparatus, so that light rays are intercepted only at one side between the optical correcting element 26 and the spherical mirror 27.

The loss of light rays in the apparatus can be decreased further by providing the film 28 with large apertures 61 which during the period of rest of the film just correspond with apertures 62 provided in the guide channel 38 of the film. Through these apertures light rays from the optical correcting element can still reach the mirror.

The whole film driving mechanism is surrounded by a light-tight case 30 in which the picture gate 29 is left clear.

Of course, in the presence of the above apertures made in the film and the guide channel for reducing the loss of light the envelope 30 is furnished with corresponding apertures 63 which may be connected by a passageway 31 for avoiding stray light in the envelope. If in this camera a shutter must also be provided use may be made of a slit shutter which is led about the envelope 30 and which, of course, must also be provided with apertures at the passageway 31.

For adjusting this camera to different distances of the object the picture gate together with the corresponding means for driving the film is mounted so as to be movable in an axial direction of the camera. All guiding means are mounted on a single bed plate 34 which is movable over the inner wall of the camera. For the entering and outgoing parts of the film the wall of the camera is provided with an aperture 35 which is shut off against incident light by the bed plate 34 of the film mechanism. The adjustment of the image at the picture gate can be controlled by means of an eye-piece 42 which passes through an aperture in the mirror and is directed to the picture gate.

Fig. 4 is a plan view of the film-guide device as shown in Fig. 3. This figure illustrates clearly the shape of rollers 33.

Fig. 5 represents a film projector based on the same principle as the recording cameras represented in the foregoing figures. The cylindrical housing 45 of the projector contains a spherical concave mirror 46 in whose center of curvature a Schmidt's optical correcting element 47 is located. The mechanism for guiding the film 54 at the picture gate 32 consists of a convex-spherical picture table 49 made from transparent material such as quartz or glass. The film 54 is caused to spherically engage this picture table by the pressure frame 48 which is concave-spherically ground and in which the picture gate 32 is left clear. This pressure window is supported by a lever 33 which is movable in the frame 34. A spring 36 provides for the necessary pressure force between the film path and the pressure window. During the time of motion of the film, i. e. upon introducing the film, the distance between the pressure frame 48 and the film path 49 is increased, against the action of the spring 36, by means of the eccentric 37 which is actuated by the mechanism for driving the film. Before and after the picture gate the film passes over two guide rollers 50 and 51 respectively which have a curved profile and are furnished with pressure rollers 52 and 53 adapted thereto. These rollers having a curved profile assist in causing the film to be curved in such manner that the entering and outgoing film parts are led parallel with each other and in the plane of the light rays to the winding and unwinding spools on the exterior of the camera, so that a minimum quantity of light is intercepted.

Because of these spools and the guiding action of rollers 50—52 and 51—53, the image carrier is guided over a looped path, portions of which are substantially parallel to the light rays.

For illuminating the image in the picture gate 32 a source of light 55 is available which radiates light through the transparent picture table 49 on the image to be projected by means of an objective 56. In this case a shutter may be superfluous when operating with an intermittent exposure of the source of light 55.

What we claim is:

1. An optical device comprising a concave spherical mirror, an optical correcting element near the center of curvature of said mirror, a support having a convex supporting surface for an image carrier, said surface being positioned between said mirror and said correcting plate, opposed roller means for tensioning the said image carrier over the said surface substantially to coincide with the focal surface of said device, said tensioning means further comprising a pair of guide rollers each having a curved surface contour such that the film is given the required spherical curvature when it engages the convex supporting surface of said support, a guide channel for carrying the image carrier to and from the tensioning means, said image carrier being transported through said guide channel to said convex support and returned through said guide channel, said guide channel being provided with apertures therein for the passage of light therethrough in the absence of an image carrier in the channel, said image carrier having apertures therein spaced apart a distance such that the apertures in oppositely moving portions are coaxial with each other and with the apertures in the guide channel when the image carrier remains stationary in order to minimize the obstruction of light incident upon the reflecting mirror.

2. An optical device comprising a concave spherical mirror, an optical correcting element near the center of curvature of said mirror, a support having a convex supporting surface for an image carrier, said surface being positioned between said mirror and said correcting plate, opposed roller means for tensioning the said image carrier over the said surface substantially to coincide with the focal surface of said device, said tensioning means further comprising a pair of guide rollers each having a barrel-shaped surface contour such that the film is given the required spherical curvature when it engages the convex supporting surface of said support, a light tight housing surrounding the convex supporting surface and the tensioning means provided with an aperture aligned with the convex supporting means, a guide channel for carrying the image carrier to and from the tensioning means, said image carrier being transported through said guide channel to said convex support and returned through said guide channel, and said tensioning roller means being spaced to prevent engagement between oppositely moving portions of the carrier entering and leaving the guide channel, said guide channel being provided with apertures therein for the passage of light therethrough in the absence of an image carrier in the channel, said image carrier having apertures therein spaced apart a distance such that the apertures in oppositely moving portions are coaxial with each other and with the apertures in the guide channel when the image carrier remains stationary in order to minimize the obstruction of light incident upon the reflecting mirror.

HERRE RINIA.
PIETER MARTINUS van ALPHEN.
FRANCISCUS LAMBERTUS van WEENEN.
LEOPOLD MICHAEL LAMBERT
JOSEPH LEBLANS.
ALBERT BOUWERS.

REFERENCES CITED

The following references are of record in the file of this patent:

UNITED STATES PATENTS

| Number | Name | Date |
|---|---|---|
| 842,314 | Heeley | Jan. 29, 1907 |
| 1,082,678 | Casler | Dec. 30, 1913 |
| 1,616,301 | Brady | Feb. 1, 1927 |
| 1,855,112 | Luboshez | Apr. 19, 1932 |
| 1,888,527 | Edouart | Nov. 22, 1932 |
| 1,927,887 | Crespinel | Sept. 26, 1933 |
| 2,036,428 | Mihalyi | Apr. 7, 1936 |
| 2,049,041 | Berggren | July 28, 1936 |
| 2,282,869 | Johnson et al. | May 12, 1942 |
| 2,294,622 | Langberg et al. | Sept. 1, 1942 |
| 2,295,802 | Nicoll | Sept. 15, 1942 |
| 2,403,660 | Hayward | July 9, 1946 |

FOREIGN PATENTS

| Number | Country | Date |
|---|---|---|
| 638,507 | Germany | Nov. 16, 1936 |

OTHER REFERENCES

"The Magical Schmidt," article in "Sky" magazine, July, 1940, pages 10 and 11.

"The Solid Glass Schmidt Camera," reprint from "Proceedings of the American Philosophical Society," vol. 82, No. 3, 1940, pages 327 to 330.